(12) United States Patent
Ren et al.

(10) Patent No.: US 8,031,615 B2
(45) Date of Patent: Oct. 4, 2011

(54) BALANCING CLUSTERS OF A WIRELESS MESH NETWORK

(75) Inventors: Wenge Ren, Sunnyvale, CA (US); Amalavoyal Chari, Sunnyvale, CA (US); Devabhaktuni Srikrishna, Sunnyvale, CA (US); Cyrus Behroozi, Menlo Park, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 795 days.

(21) Appl. No.: 11/711,357

(22) Filed: Feb. 27, 2007

(65) Prior Publication Data
US 2008/0205360 A1 Aug. 28, 2008

(51) Int. Cl.
- G01R 31/08 (2006.01)
- G06F 11/00 (2006.01)
- H04L 12/28 (2006.01)
- H04L 12/56 (2006.01)
- H04J 3/16 (2006.01)

(52) U.S. Cl. .................. 370/238; 370/254; 370/401

(58) Field of Classification Search ................ None
See application file for complete search history.

(56) References Cited

U.S. PATENT DOCUMENTS

| | | | |
|---|---|---|---|
| 5,471,469 A | 11/1995 | Flammer, III et al. | |
| 5,572,528 A | 11/1996 | Shuen | |
| 6,044,062 A | 3/2000 | Brownrigg et al. | |
| 6,097,703 A | 8/2000 | Larsen et al. | |
| 6,249,516 B1 | 6/2001 | Brownrigg et al. | |
| 6,493,377 B2 | 12/2002 | Schilling et al. | |
| 6,879,574 B2 | 4/2005 | Naghian et al. | |
| 6,965,575 B2 * | 11/2005 | Srikrishna et al. | 370/252 |
| 7,120,681 B2 * | 10/2006 | Frelechoux et al. | 709/221 |
| 2003/0179718 A1 * | 9/2003 | Ebata et al. | 370/255 |
| 2004/0171347 A1 | 9/2004 | Burton et al. | |
| 2004/0203787 A1 | 10/2004 | Naghian | |
| 2004/0252643 A1 | 12/2004 | Joshi | |
| 2004/0264379 A1 * | 12/2004 | Srikrishna et al. | 370/238 |
| 2005/0074015 A1 * | 4/2005 | Chari et al. | 370/400 |
| 2005/0243765 A1 * | 11/2005 | Schrader et al. | 370/328 |
| 2005/0254473 A1 * | 11/2005 | Preguica et al. | 370/338 |
| 2006/0109815 A1 * | 5/2006 | Ozer et al. | 370/329 |
| 2006/0215673 A1 * | 9/2006 | Olvera-Hernandez | 370/406 |
| 2007/0299950 A1 * | 12/2007 | Kulkarni | 709/223 |

* cited by examiner

*Primary Examiner* — Chirag Shah
*Assistant Examiner* — Ashley Shivers
(74) *Attorney, Agent, or Firm* — Brian R. Short

(57) ABSTRACT

An apparatus and method of propagating a size of a cluster within a wireless mesh network is disclosed. The method includes a gateway within the cluster maintaining information of access nodes within the cluster. The gateway determines a cluster size based on the maintained information, and transmits routing packets that include the cluster size of the gateway. An apparatus and method of balancing clusters of a wireless mesh network is also disclosed. The method includes the gateway of each cluster originating beacons, wherein the beacons include a size of the cluster of the gateway. The access nodes of each cluster, re-broadcasts beacons received from the gateway of the cluster. A connecting access node selects which cluster to connect to at least in part based on the size of each of the clusters.

32 Claims, 6 Drawing Sheets

```
                    ┌─────────────────────────────────────────┐
                    │ The access node evaluating a plurality of clusters of a │
                    │ wireless mesh network, wherein each cluster includes │
                    │              a gateway                  │
                    │                                         │
                    │                  510                    │
                    └─────────────────────────────────────────┘
                                        │
                                        ▼
                    ┌─────────────────────────────────────────┐
                    │ The access node selecting a routing path to a │
                    │ gateway of the wireless mesh network based on a │
                    │ combination of routing selection parameters, one of │
                    │ the parameters being a size of each of the clusters │
                    │                  520                    │
                    └─────────────────────────────────────────┘
```

FIGURE 5

BALANCING CLUSTERS OF A WIRELESS MESH NETWORK

FIELD OF THE INVENTION

The invention relates generally to wireless communications. More particularly, the invention relates to a method and apparatus of balancing clusters of a wireless mesh network.

BACKGROUND OF THE INVENTION

Wireless mesh networks are gaining popularity because wireless infrastructures are typically easier and less expensive to deploy than wired networks. A wireless mesh network configuration includes gateways and access nodes that form the wireless mesh. Each access node typically has multiple possible routing paths through the mesh network, and attempts to select the best routing path. The best routing path, however, can vary over time. In addition to selecting the best routing path, access nodes can also select the optimal operating channel based on multiple metrics, such as, interference, noise level, airtime quality and path quality.

The routing of many access nodes can naturally select a majority of the routing paths through a minority of the gateways. That is, the routing of the mesh networks can become unbalanced in that the number of nodes routing through one gateway may be disproportionately large compared to the number of nodes routing through another gateway.

The access nodes and gateways communicate with each other over wireless links. Therefore, the access nodes and gateways typically suffer from self-interference. That is, the access nodes and gateways tend to be somewhat proximate to each other, and typically, can receive at least some transmission signal energy (unintended) from each other. The unintended signal energy interferes with the intended transmission signals, resulting in self-interference.

Wireless networks are also susceptible to interference due to signals generated by electronic devices that are not associated with the networks. The types of interference signals can vary over time as the electronic devices are turned on and off, and relocated.

It is desirable to have a method and apparatus for providing selection of routing paths through wireless mesh networks and channel selections that are adaptable to characteristics of the wireless mesh network. It is also desirable to balance a size of clusters within the wireless mesh network.

SUMMARY OF THE INVENTION

One embodiment of the invention includes a method of propagating a size of a cluster within a wireless mesh network. The method includes a gateway within the cluster maintaining information of access nodes within the cluster. The gateway determines a cluster size based on the maintained information, and transmits routing packets that include the cluster size of the gateway.

Another embodiment of the invention includes a method of balancing clusters of a wireless mesh network, wherein each cluster includes a gateway. The method includes the gateway of each cluster originating beacons, wherein the beacons include a size of the cluster of the gateway. The access nodes of each cluster, re-broadcasts beacons received from the gateway of the cluster. A connecting access node selects which cluster to connect to based at least in part on the size of each of the clusters.

Other embodiments include methods of an access node selecting a routing path, and/or selecting a transmission channel. The methods include the access node receiving a cluster size from a plurality of wireless mesh network clusters, wherein each cluster includes a gateway. The access node selects a routing path to a gateway of the wireless mesh network and/or selects a transmission channel based on a combination of routing selection parameters, one of the parameters being the size of the clusters.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 is a flow chart that shows steps of one example of a method of an access node selecting a routing path.

DETAILED DESCRIPTION

Figure 1:
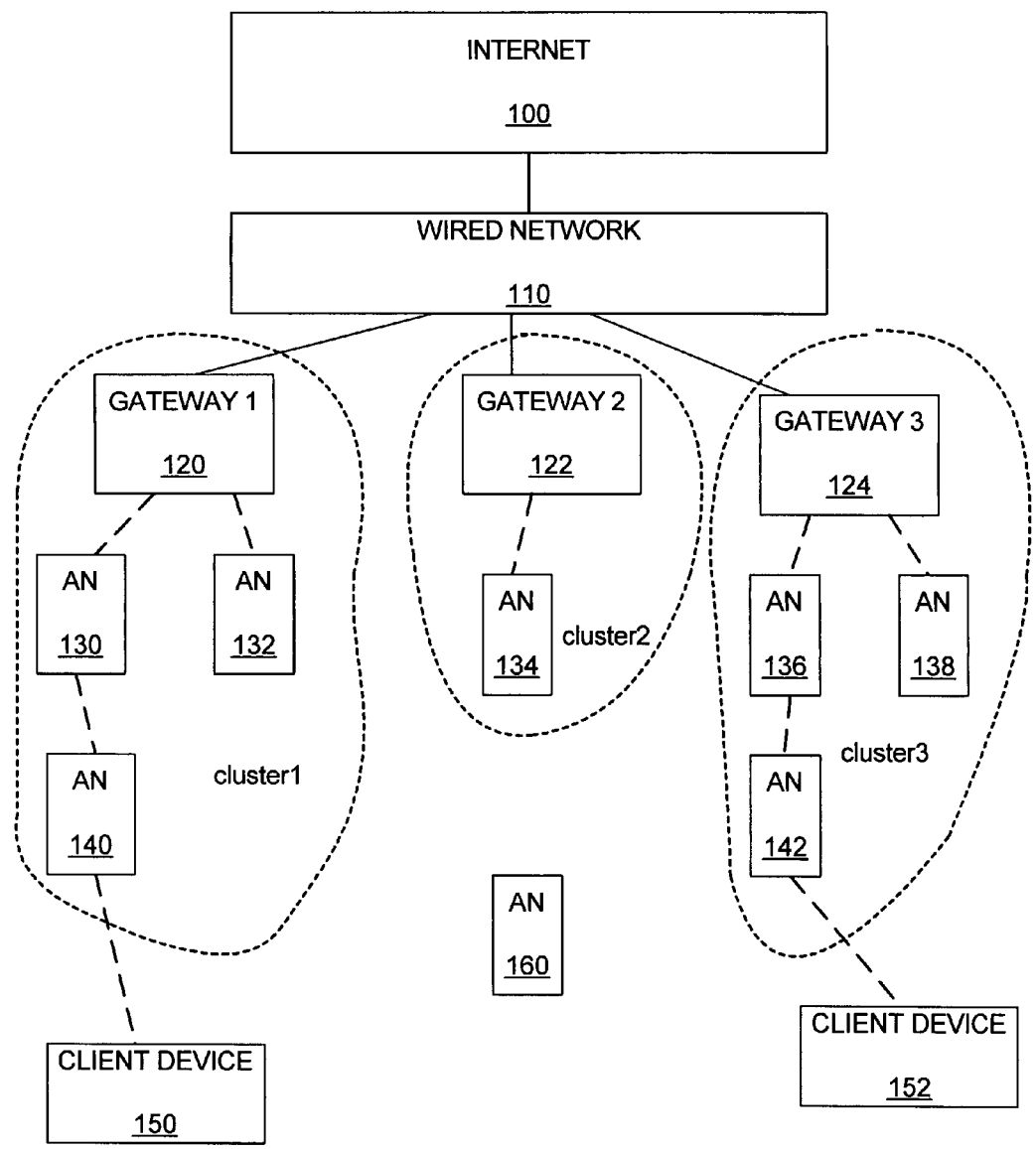
FIG. 1 shows a wireless mesh network that includes multiple clusters.

As shown in the drawings for purposes of illustration, the invention is embodied in an apparatus and method for adaptively balancing clusters within wireless mesh network. Methods of adaptively balancing clusters can include, for example, selecting routes through the mesh network based on cluster size, and/or selecting transmission channels based on cluster size.

FIG. 1 shows a wireless mesh network that includes gateways 120, 122, 124. Each of the gateways form a wireless mesh cluster, in which each cluster includes the corresponding gateway and access nodes routing through with the gateway. For example, a first cluster (cluster 1) includes the gateway 120 and associated access nodes 130, 132, 140. A second cluster (cluster 2) includes the gateway 122 and associated access node 134. A third cluster (cluster 3) includes the gateway 124 and associated access nodes 136, 138, 142.

The gateways 120, 122, 124 can be wirelessly or wired connected to a wired network 110, which can be connected to the internet 100. The wireless mesh network provides clients (for example, client devices 150, 152) access to the wired network 110. As will be described, an embodiment of the gateways originates beacons that include information about the gateway. The information can include gateway identification and a cluster size of the gateway.

A client generally can include a laptop computer, a personal digital assistant (PDA), a cell-phone, or any other device that includes as interface card adaptable for use with the mesh network of the invention. The client can access the network though wired or wireless connections. Wireless clients can access the network through a MAC (media access control), PHY (physical layer) protocol such as IEEE 802.11. The 802.11 protocol includes authentication and association protocols between client devices and the network.

FIG. 1 also shows an access node 160 that has either roamed to the clusters of the wireless network, or is powered-up and initiating a route selection with the wireless mesh network. The access node 160 must select a route to one of the gateways of one of the clusters. Several factors can be used in determining which route to gateway an access node selects. Factors that influence cluster balancing of a wireless mesh network include routing and transmission channel selections. That is, if an access node preferentially selects routes through smaller clusters, the cluster sizes of the wireless mesh network are more likely to be normalized, and therefore, more balanced. Similarly, if an access node preferentially selects a transmission channel over which it has available routing paths through smaller clusters, the cluster sizes of the wireless mesh network are more likely to be balanced.

For an embodiment, each of the clusters transmits communication (data) over a different one of a plurality of transmission channels. For this embodiment, the access node 160 also selects a transmission channel. All of the clusters of a wireless mesh network do not have to operate over different transmission channels. However, generally, adjacent clusters operate over different transmission channels to minimize interferences between clusters. For another embodiment, each cluster does not have to operate over a single transmission channel. A single cluster can include multiple transmission channels being used for different transmission links of the cluster.

Access Node Routing Selections

Access nodes 130, 132, 134, 136, 140, 142 are coupled either directly or indirectly to the gateways 120, 122, 124. That is, each access node is either directly connected to one of the upstream gateways 120, 122, 124, or indirectly connected through another access node to one of the upstream gateway 120, 122, 124. Many factors can be included in the decision of which upstream access nodes or gateways each access node is connected to. The mesh network of FIG. 1 can include any number of additional gateways and access nodes. As shown in FIG. 1, clients 150, 152 can obtain access to the network by establishing a connection to an available access node, such as, any of access nodes 140, 142.

For an exemplary embodiment, the gateways 120, 122, 124 transmit (for example, by broadcast) routing packets (beacons), which can be used to determine routing paths between access nodes 130, 132, 134, 136, 140, 142 and the gateways 120, 122, 124 of the network. The beacons are received by all first-level access nodes (for example, access nodes 130, 132, 134, 136), which are access nodes that are able to receive gateway transmitted beacons, and directly route data through to a gateway.

The beacons as originated at gateways include an identifier of the gateway and a size of the cluster of the gateway. An embodiment of the gateways includes the gateways maintaining information of access nodes within the cluster of the gateway. For one embodiment, the information is maintained as a routing table that includes all downstream devices that are connected to the gateway. The routing tables of each gateway includes enough information to allow the gateways to determine the size of the gateway's cluster.

The beacons are used to establish a route from each access node to a gateway. The first level access nodes re-transmit (for example, by re-broadcast) the beacon data, attaching their own information to the beacon. The information indicates to the second level access nodes that an available path to the gateway includes the first level access node. The rebroadcast information can include the addresses of all upstream access nodes along the path to the gateway access node. That is, an embodiment includes each access node that receives routing beacons, modifying the routing beacons of a selected route by attaching an address of the access node, and re-broadcasting the modified beacons.

For one embodiment, the link quality of the beacon received determines whether that beacon is rebroadcast by the access node. If the quality of the beacon is above a determined threshold, it is rebroadcast. Alternatively, if the quality of the beacon is greater than the quality of all other received beacons, the beacon is rebroadcast. Another embodiment includes each access node only re-broadcasting beacons received from its currently-chosen default gateway (the default gateway is the last selected upstream gateway).

Beacons can be used to determine the quality of the link in both an upstream (towards a gateway) direction, and in a downstream (away from a gateway) direction. Additionally the quality of a link can be influenced by the size of the cluster the link is connected to. The upstream and the downstream direction link qualities, and the cluster size can be used by each access node to select the best data routing path to a gateway. The link qualities can be influenced by other wireless transmission factors such as interference, noise and fading. The link qualities can be determined by calculating the percentage of beacons that are transmitted and successfully received. The link qualities can alternatively or additionally be determined by measuring a PER, BER or SNR of received routing beacons. As described, the link qualities being influenced by the size of the cluster of the device (gateway or access node) that is transmitting the beacon.

Asymmetrical characteristics of the links between access nodes and the gateways can lead to non-optimal routing selections if, for example, the quality of the upstream direction links is not included in routing decisions by access nodes to gateways. Each gateway and access node transmits beacons. All access nodes and gateways that receive the beacons can make an estimate of the quality of the link based upon the reception of the beacons. The estimates can include both upstream direction link quality and downstream direction link quality. Once each access node has the upstream and downstream link qualities within every possible data path to a gateway, the access node can make a selection of the best available data path.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 1 also includes a second level access nodes 140, 142. The second level access nodes select the best quality links to first level access nodes (assuming there are no links to gateways of better quality). Again, the first level access nodes re-transmit (rebroadcast) successfully received routing packets. The link quality can be determined by calculating the percentage of beacons that are transmitted and successfully received by the second level access nodes. As previously described, the link quality can be additionally influenced by the receive link quality, the size of the clusters transmitting the beacons, and even the hop count of the beacons. The hop count is defined by the number of wireless hops the beacon has traveled, wherein each wireless link counts as a hop. The number of levels of the access nodes of the mesh network is not limited.

When the access node 160 selects a route to a gateway, the access node 160 can receive beacons from not only multiple clusters, but also from multiple nodes within each cluster. As previously stated, the selection can be based on a size of the cluster originating the beacons, the downlink quality (as determined, for example, by a persistence of successfully received routing beacons), uplink quality (as determined, for example, by a persistence of successfully received upstream traveling beacons), and hop count (as can be determined by including hop count within the beacons and incrementing the hop count each time the beacon is re-broadcast). Other factors can be used in the routing selection as well.

Figure 2:
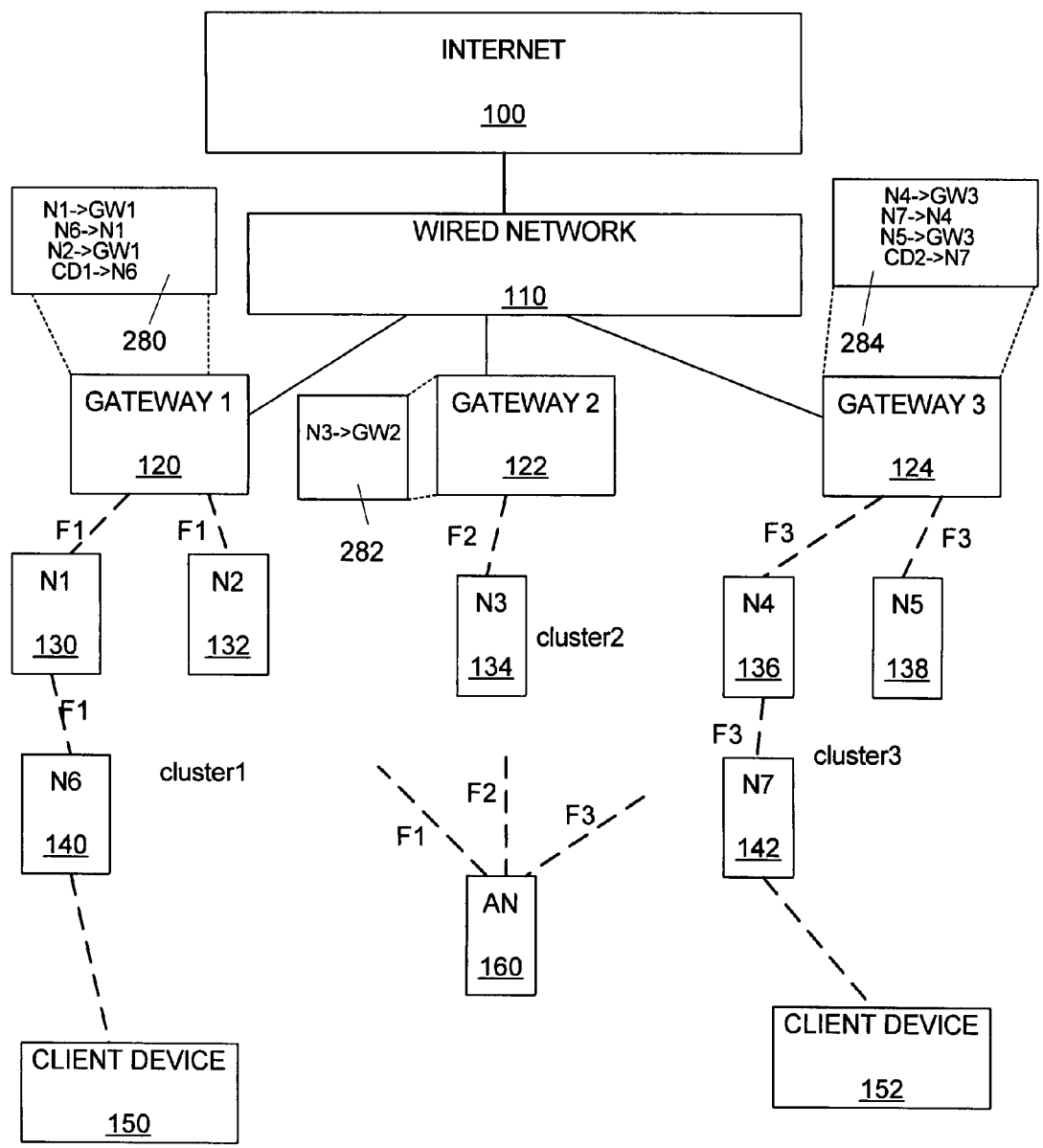
FIG. 2 shows a wireless mesh network that includes routing tables, and clusters that for one embodiment, operates on different transmission channels.

FIG. 2 shows a wireless mesh network that includes routing tables, and clusters operating on different transmission channels. A routing table for each gateway is generated providing each gateway with a selected route to every device within the cluster of the gateway. While the clusters of FIG. 2 are shown as each having a single transmission frequency, other embodiments include clusters that have multiple transmission frequencies within a single cluster. The single transmission frequency embodiments described herein are examples for aiding in the discussion of access nodes selecting routing paths and transmission frequencies based on cluster sizes.

Each access node that selects a gateway or another access node as an upstream device, informs that upstream device that the access node is connected to the upstream device. The access node also informs the upstream device of all downstream devices connected to the access node. Therefore, each access nodes or gateways can form a routing table that includes all downstream devices. Once the routing tables have been formed, each gateway can determine the size of its clusters.

The gateways 120, 122, 124 of FIG. 2 include routing tables 280, 282, 284. The routing table of the gateway 120 indicates that a first access node (N1) 130 is connected to the first gateway 120, a second access node (N2) 132 is connected to the first gateway 120, and a sixth access node (N6) 140 is connected the first access node (N1) 130. The routing table can also indicate client devices that are connected. For example, the routing table 280 indicates that a first client device 150 is connected to the sixth access node (N6) 140. Based on this routing table, the gateway 120 can determine that it has three access nodes 130, 132, 140 within its cluster (cluster 1). As previously described, the first gateway 120 includes the cluster size within the beacons originated by the first gateway 120.

The routing table 282 indicates that a third access node (N3) 134 is connected to a second gateway 122. Therefore, the second gateway 122 can determine that it has one access node within its cluster. The cluster size is included within the beacons originated by the second gateway 122.

The routing table 284 indicates that fourth and fifth access nodes (N4, N5) 136, 138 are connected to a third gateway 124, that a seventh access node (N7) 142 is connected to the fourth access node (N4) 136, and that a second client device 152 is connected to the seventh access node (N7) 142.

Operating neighboring clusters on different transmission channels can help reduce interference between clusters of a wireless mesh network. The transmission frequency of the first cluster can be set to F1, the transmission frequency of the second cluster can be set to F2, and the transmission frequency of the third cluster can be set to F3. It is to be understood that other embodiments include clusters operating over multiple channels having multiple transmission frequencies.

An embodiment includes the gateways propagating the size of their associated cluster by including the cluster size in the beacons. Access nodes select their transmission frequencies based at least in part, on the size of the clusters that transmit the beacons. For example, the access node 160 selects a transmission frequency (such as, F1, F2, F3) depending upon which cluster the access node selects its routing path. The selection is dependent upon the size of the clusters as determined by beacons received from the clusters. For clusters that include transmission channels having multiple transmission frequencies, an access node can receive beacons from the same cluster over multiple frequencies.

Setting the transmission frequencies of the proximate clusters to different frequencies mitigates self-interference to some extent. However, typically, there are only a finite number of available transmission frequencies. Therefore, the transmission frequencies must be repeated for at least some clusters of a large wireless mesh network. As a result, some self-interference still occurs. Additionally, as will be described later, the access nodes of a cluster may be able to obtain a better network connection by switching to a different transmission frequency than the one the access node is presently operating at.

Providing gateways and access nodes of a wireless network with the ability to adaptively select transmission frequencies can help mitigate the effects of self-interference, and interference due to external electronic devices. Previously selected transmission frequencies can become less desirable over time due to external interfering signal generated by other electronic devices, such as, other 802.11 devices, cordless phones and blue-tooth devices. Also, previously selected transmission frequencies can become less desirable due to environment effects, such as, moving objects and falling leaves of trees. Additionally, previously selected transmission frequencies can become obsolete as the wireless network grows and changes over time.

The gateways and access nodes can adaptively select their transmission frequencies. For example, an embodiment includes the gateways cycling through a plurality of available transmission channels. The gateways evaluate each of the available transmission channels, and select a cluster transmission channel based on the channel evaluations.

The channel evaluation can include any combination of the channel contention, channel noise and/or a percentage of time a channel is clear. Other channel conditions can additionally, or alternately be evaluated as well.

Generally, a wireless mesh network has a set of available transmission frequencies. For example, an 802.11(b) wireless network can include transmission channel frequencies of 2.412 GHz, 2.417 GHz, 2.422 GHz, 2.427 GHz, 2.432 GHz, 2.437 GHz, 2.442 GHz, 2.447 GHz, 2.452 GHz, 2.457 GHz, 2.462 GHz.

Depending upon the proximity of neighboring clusters, the transmission frequencies of the neighboring clusters, and the environment of the wireless network, self-interference between the clusters of the wireless network can vary depending upon the transmission frequencies of each of the clusters. Cycling each cluster through all of the available transmission frequencies allows each cluster to evaluate the contention and noise to determine which of the available transmission frequencies is the best.

The cycling can be as simple as progressively stepping through each of the available transmission frequencies. However, the cycling can be configurable and include some intelligence. For example, contention of one channel influences to some extent contention of a neighboring channel. Therefore, it can be more efficient to skip available channels in the scheduling. For example, for 11 available channels, the sequence could be 1-3-5-7-9-11 or 2-4-6-8-10. However, any sequence is possible.

Several different possible methods can be used for evaluating the channel contention. One example includes the contention evaluating node (gateway) determining how many other clusters with similar devices can be received in the channel being evaluated. A similar device can be defined as devices having a MAC address within a common, unique range. This can indicate, for example, that the devices are of a common manufacturer. Routing packets, (beacons) as described later, can include a gateway address that allows for identification of the other clusters. The evaluating gateway can determine contention by counting the number of other clusters that the evaluating gateway receives routing packets from.

Another example includes the contention evaluating gateway determining how many other similar devices (gateways and access nodes) that the evaluating gateway can receive 802.11 signals above a predetermined threshold signal level from. The MAC address of the 802.11 signal can be used to identify the source of the 802.11 signal.

Another example includes the contention evaluating gateway determining how many 802.11 signal generating devices (similar or not) that the evaluating gateway can receive 802.11 signals above a predetermined threshold from.

Generally, 802.11 chip sets provide channel noise estimates of a channel. One example of evaluating channel noise includes averaging many of these noise estimates over a predetermined period of time. Noise estimates that deviate greatly from the other estimates can be tossed out and not included within the average because it can be assumed that these estimates are erroneous. The noise evaluating process can be repeated once every predetermined period of time. The mesh network can adjust the predetermined period depending upon the stability of the channel noise of the network.

A gateway evaluation of the channel noise can additionally include feedback from access nodes of the cluster of the gateway. The access nodes can use processes that are similar to the channel noise evaluating processes of the gateway. That is, the access nodes can average channel noise estimates over time, while neglecting estimates that are obviously bad. One embodiment includes the access node only feeding back estimated channel noise when the estimated channel noise of the access node is greater than a predetermined threshold.

The gateway or access node can evaluate the percentage of time the channel is clear by monitoring the percentage of time that, for example, other 802.11 devices are using the channel.

Channel transmission frequency selection is based on the channel evaluation. As described, the channel evaluation can include evaluations of channel contention, channel noise and/or a percentage of time a channel is clear. One embodiment of the channel evaluation includes channel contention and channel noise evaluations. An example of a method of selecting the channel transmission frequency includes first dropping all channels that have an evaluated noise greater than a predetermined threshold. Of the channels that are left, the channel having the least amount of contention is selected. If none of the available transmission channels have a channel noise estimate of greater than the predetermined threshold, then the transmission channel having the least contention is selected.

Several different criteria can be used to initiate cycling between the available transmission channels. For gateways, the cycling through the available transmission channels can be initiated by a clocked maintenance. That is, for example, the cycling can be initiated once every predetermined number of days. Changes in the conditions of the wireless network can be accounted for by updated the transmission frequencies of the clusters.

Both gateways and access nodes can initiate or trigger cycling through the available transmission channels by detecting the channel noise exceeding a threshold. The channel noise can be monitored once every predetermined period of time (for example, once every 10 minutes). As previously described, channel noise estimates can be averaged with the obviously bad estimates tossed out. If the average exceeds a predetermined threshold, the transmission frequency cycling is initiated.

Both gateways and access nodes can initiate or trigger cycling through the available transmission channels by detecting the channel only being clear a predetermined percentage of time. The gateway or access node can monitor the percentage of time that, for example, other 802.11 devices are using the channel. If over a predetermined duration of time, the other 802.11 devices are using the channel greater than a predetermined percentage of the time, then the transmission frequency cycling is initiated.

Once a gateway has determined a schedule of the cycling through the available transmission channels, the gateway communicates the schedule to the access nodes of the cluster. This allows the access nodes of the cluster to change their transmission channels along with the gateway. The schedule includes the channel sequence of the cycling along with the timing and duration of each of the transmission channels. For example, the sequence could be channels 1-6-11 in which each channel is evaluated for one minute a piece. The access nodes can then tune their transmission channels according to the timing, duration and sequence of the cycling schedule.

Many different clusters can exist within a wireless mesh network. Each of the clusters can include the adaptive channel selection capabilities. It is desirable to have clusters that are proximate to each other (that is, they are close enough to wirelessly receive communication signals from each other) execute their frequency channel cycling at different times.

One embodiment includes each gateway receiving information from other gateways of neighboring clusters, allowing the gateway to avoid cycling through the plurality of available transmission channels while the neighboring clusters are cycling through transmission channels. The information is received through wireless connection rather than through, for example, a back haul wired connection.

The gateway can then coordinates its cycling through the plurality of available transmission channels based on the information received from the other gateways of the neighboring clusters. The other gateways can similarly coordinate their cycling through the available transmission channels.

Another embodiment includes each gateway and the gateways of the neighboring clusters each perform cycling through the transmission channels at randomized times within a predetermined range of start times. The randomization of the start times make is probable that neighboring gateways will execute their cycling at different times.

The access nodes can receive routing beacons from any upstream device (another access node or a gateway) while cycling through the available transmission channels. Therefore, an access node can change to a new cluster when cycling through the available transmission frequencies if a better path to another gateway is discovered.

As previously described, an embodiment includes the access nodes of the mesh network receiving a schedule of when the default gateway of the cluster of the access node is going to cycle through the available transmission channels. The access node can remain with the present cluster if the access node determines that the present cluster provides the best path to an upstream gateway.

The frequency channel cycling of an access node can be sped up if the access node is not receiving any routing packets over transmission channel being evaluated. That is, if the access node tunes to a transmission channel and does not receive any routing packets, the access node can immediately skip to the next transmission channel of the schedule. This, however, only applies to access node initiated transmission channel cycling. If a gateway initiates the transmission channel cycling, the access node will typically have to follow the transmission cycling schedule generated by the gateway.

Figure 3:
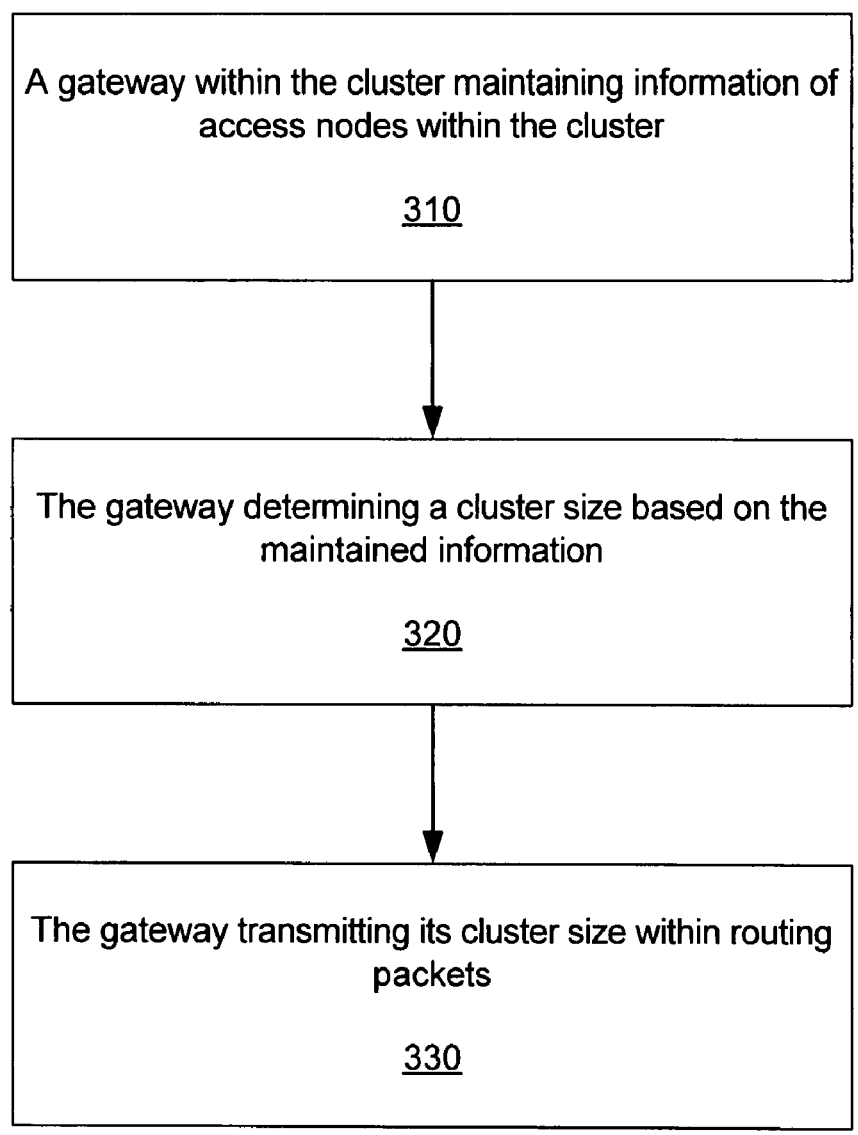
FIG. 3 is a flow chart that shows steps of one example of a method of propagating a size of a cluster within a wireless mesh network.

FIG. 3 is a flow chart that shows steps of one example of a method of propagating a size of a cluster within a wireless mesh network. A first step 310 includes a gateway within the cluster maintaining information of access nodes within the cluster. A second step 320 includes the gateway determining a cluster size based on the maintained information. A third step 330 includes the gateway transmitting its cluster size within routing packets.

Each access node that receives the broadcasted cluster size from the gateway, can rebroadcast the cluster size. For an embodiment, connecting access node selects a routing path to the gateway based at least in part on the cluster size, wherein the connected access nodes prefer routing through smaller clusters than larger clusters.

The cluster size can be determined in several different ways. The cluster size of one embodiment is determined by the number of access nodes within a cluster. Another embodiment further includes downstream devices of the connecting access node when determining the cluster size. That is, when comparing the cluster sizes of different clusters that the connecting access node may connect to, the connecting access node also includes devices that are downstream to the connecting access node. This can influence the decision of which cluster to connect to because generally other factors such as hop count and routing packet persistence are also used in the cluster selection decision. Other embodiments also include client devices as downstream devices that are included within the cluster size. If the downstream devices include access nodes and client devices, one can be weighted differently than the other. Another embodiment does not count mobile nodes as a downstream device, and therefore, are not counted in the cluster size.

For an embodiment, a connecting access node selects a transmission channel at least in part, based on the cluster size, wherein connecting nodes prefer selection of transmission channels associated with smaller clusters rather than larger clusters.

As previously described, the determination of the cluster size can be made based upon the number of access nodes within each cluster. Additionally, the cluster size can also include devices that are downstream of the connecting access node. As previously described, the downstream devices can include access nodes downstream to the connecting access node, or client devices downstream to the connecting access node. The downstream client devices can be weighted differently than the downstream access nodes.

Figure 4:
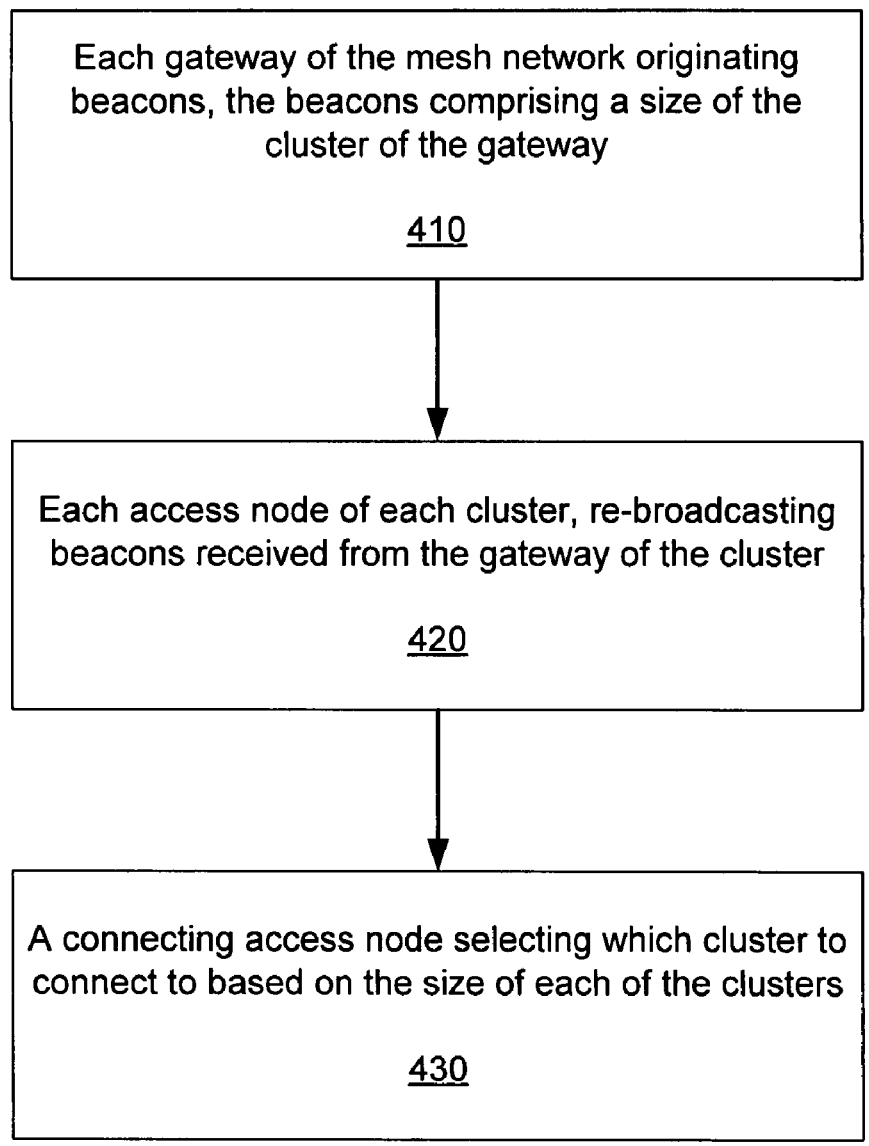
FIG. 4 is a flow chart that shows steps of one example of a method of balancing clusters of a wireless mesh network.

FIG. 4 is a flow chart that shows steps of one example of a method of balancing clusters of a wireless mesh network. A first step 410 includes the gateway of each cluster of the mesh network originating beacons, the beacons comprising a size of the cluster of the gateway. A second step 420 includes the access node of each cluster, re-broadcasting beacons received from the gateway of the cluster. A third step 430 includes a connecting access node selecting which cluster to connect to based on the size of each of the clusters.

The connecting access node selects a routing path to a gateway of the wireless mesh network based on a combination of routing selection parameters, one of the parameters being the size of clusters the connecting access node receives beacons from. The connecting access nodes prefer selecting routing paths of gateways having smaller clusters rather than gateways having larger clusters. Other routing selection parameters include a persistence of successfully received beacons, a reverse persistence of routing beacons (that is, upstream persistence), and hop count as included within re-broadcast beacons.

The connecting access node selects a transmission channel based at least in part on the size of the clusters the connecting access node receives beacons from. The connecting access nodes prefer selecting a transmission channel of a smaller cluster rather than a transmission channel of a larger cluster. Other transmission channel selection parameters include a persistence of successfully received beacons, a reverse persistence of routing beacons (that is, upstream persistence), and hop count as included within re-broadcast beacons.

The clusters can include a plurality of transmission frequencies. Each cluster can include a single transmission frequency, or multiple transmission frequencies.

FIG. 5 is a flow chart that shows steps of one example of a method of an access node selecting a routing path. A first step 510 includes the access node evaluating a plurality of clusters of a wireless mesh network, wherein each cluster includes a gateway. A second step 520 includes the access node selecting a routing path to a gateway of the wireless mesh network based on a combination of routing selection parameters, one of the parameters being a size of each of the clusters.

As previously described, the routing selections attempt to select the best routing path to an upstream gateway. The connecting access node attempts to select the wireless mesh network cluster that provides the best routing path to an upstream gateway. The selection is base at least in part on the size of the clusters. The connecting access node can retrieve the cluster size from nodes of the wireless mesh network clusters, or the connection access node can receive the cluster size, for example, by receiving beacons from the clusters that include the cluster sizes. Smaller cluster sizes tend to load backhaul connections of gateways of the clusters more lightly. The loading of the gateway the connecting access node connecting to, influences the perceived quality of the routing path to the gateway. The selection can additionally be based on a persistence of successfully received routing packets and/or hop count. The routing packets are originated at the gateways of each of the clusters. Each receiving access node can rebroadcast successfully received routing packets. Therefore, the better the quality of the links within a routing path to a gateway, the greater the persistence of the successfully received routing packets at the connecting access node, indicating a higher quality routing path to a gateway.

Figure 6:
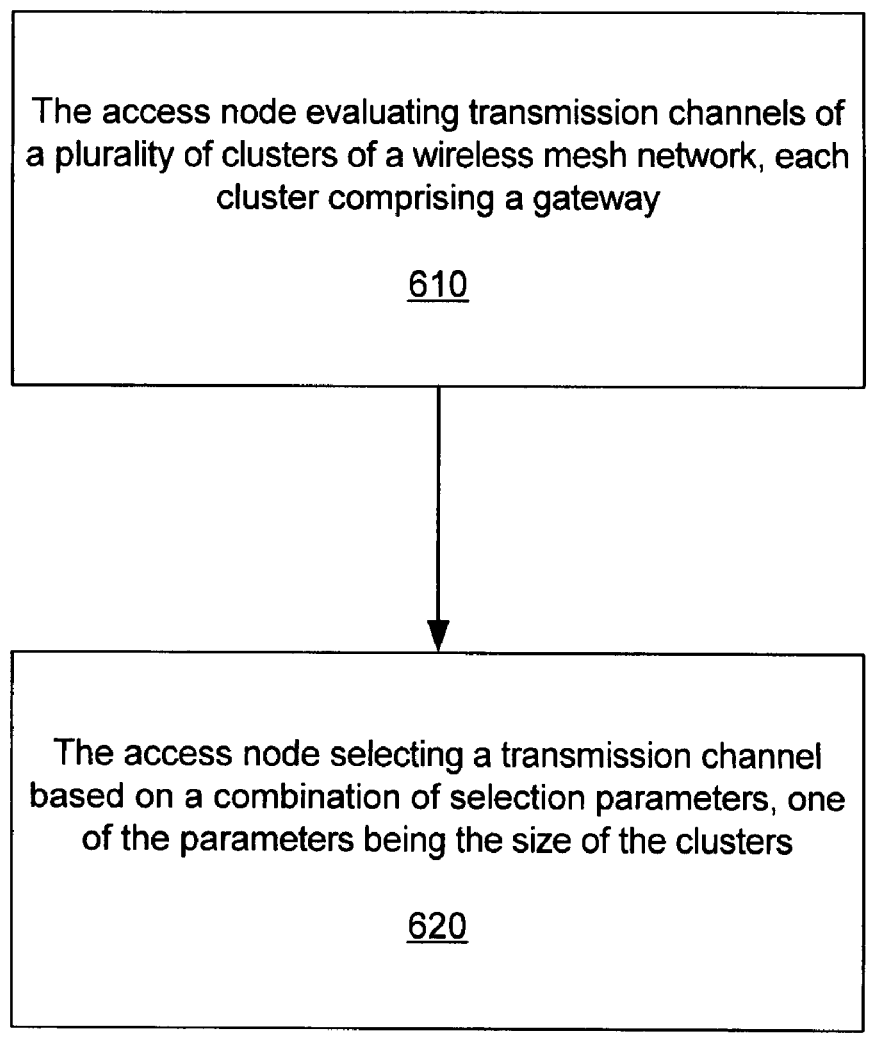
FIG. 6 is a flow chart that shows steps of one example of a method of an access node selecting a transmission channel.

FIG. 6 is a flow chart that shows steps of one example of a method of an access node selecting a transmission channel. A first step 610 includes the access node evaluating transmission channels of a plurality of clusters of a wireless mesh network, each cluster comprising a gateway. A second step 620 includes the access node selecting a transmission channel based on a combination of selection parameters, one of the parameters being the size of the clusters. The selection can additionally be based on a persistence of successfully received routing packets and/or hop count.

The connecting access node can retrieve the cluster size from nodes of the wireless mesh network clusters, or the connection access node can receive the cluster size, for example, by receiving beacons from the clusters that include the cluster sizes.

Although specific embodiments of the invention have been described and illustrated, the invention is not to be limited to the specific forms or arrangements of parts so described and illustrated. The invention is limited only by the appended claims.

What is claimed:

1. A method of propagating information regarding a size of a cluster within a wireless mesh network, comprising:
   a gateway within the cluster maintaining information of access nodes within the cluster;
   the gateway determining a cluster size based on the maintained information, wherein the cluster size is based on a number of access nodes within the cluster;
   the gateway including its cluster size within routing packets;
   wherein each connecting access node not within the cluster determines whether to route through the gateway based at least in part on the cluster size of the gateway, and additionally based on a number of devices that are downstream from the connecting access node.

2. The method of claim 1, further comprising access nodes of the cluster that receive cluster size within the routing packets, re-transmitting the cluster size.

3. The method of claim 1, wherein the connected access nodes prefer routing through smaller clusters than larger clusters.

4. The method of claim 1, wherein downstream devices comprise at least one of downstream access nodes and downstream client devices.

5. The method of claim 4 wherein the downstream access nodes are weighted differently than the downstream client devices.

6. The method of claim 1, wherein downstream mobile nodes do not count as downstream devices.

7. The method of claim 1, further comprising the gateway originating and broadcasting the routing packets.

8. The method of claim 1, further comprising the gateway maintaining a routing table that includes the information of access nodes of the cluster.

9. The method of claim 1, further comprising a connecting access node selecting a transmission channel at least in part, based on the cluster size of a gateway operating on that channel.

10. The method of claim 9, wherein connecting nodes prefer selection of transmission channels associated with gateways that have smaller clusters rather than gateways having larger clusters.

11. The method of claim 9, wherein connecting access nodes select the transmission channel based at least in part on a number of downstream devices associated with the connecting access node.

12. The method of claim 11, wherein downstream devices comprise at least one of downstream access nodes and downstream client devices.

13. The method of claim 12 wherein the downstream access nodes are weighted differently than the downstream client devices.

14. A method of balancing clusters of a wireless mesh network, each cluster comprising a gateway, the method comprising:
   the gateway of each cluster originating beacons, the beacons comprising a size of the cluster of the gateway, wherein the size of the cluster is based on a number of access nodes within the cluster;
   the access nodes of each cluster, re-broadcasting beacons received from the gateway of the cluster;
   a connecting access node selecting which cluster to connect to based on the size of each of the clusters, wherein the connecting access node is not within the clusters, and
   the connecting access node estimating a projected cluster size by summing the size of each cluster with a number of nodes downstream from the connecting access node, and the connecting access node using the projected cluster size in its routing selection.

15. The method of claim 14, wherein the connecting access node selects a routing path to a gateway of the wireless mesh network based on a combination of routing selection parameters, one of the parameters being the size of clusters the connecting access node receives beacons from.

16. The method of claim 15, wherein connecting access nodes prefer selecting routing paths of gateways having smaller clusters rather than gateways having larger clusters.

17. The method of claim 15, wherein the connecting access node selecting a routing path further includes at least one of a persistence of successfully received beacons, a persistence of successfully received reverse beacons, and a hop count included within re-broadcast beacons.

18. The method of claim 14, wherein the connecting access node selects a transmission channel based at least in part on the size of the clusters the connecting access node receives beacons from.

19. The method of claim 18, wherein the connecting access nodes prefer selecting a transmission channel of a smaller cluster rather than a transmission channel of a larger cluster.

20. The method of claim 18, wherein the clusters comprise a plurality of transmission channels.

21. The method of claim 18, wherein the gateway and all access nodes within each cluster, comprise a single transmission channel.

22. The method of claim 18, wherein the connecting access node selecting a transmission channel further includes at least one of a persistence of successfully received beacons, a persistence of successfully received reverse beacons, and a hop count included within re-broadcast beacons.

23. The method of claim 22, wherein the connecting access node estimates a projected cluster size by summing the size of each cluster with a number of nodes downstream from the connecting access node, and the connecting access node uses the projected cluster size in its routing selection.

24. The method of claim 14, wherein each gateway has a routing table that includes routes to all access nodes within the cluster of the gateway, thereby allowing the gateway to determine the size of its cluster.

25. A method of a connecting access node selecting a routing path, comprising:
   the connecting access node evaluating a plurality of clusters of a wireless mesh network, wherein the connecting access node is not within the plurality of clusters;
   the connecting access node selecting a routing path to a gateway of the wireless mesh network based on a combination of routing selection parameters, one of the parameters being a size of each of the clusters, wherein the size of each cluster is based on a number of access nodes within the cluster, and wherein the connecting access node estimates a projected cluster size by summing the size of each cluster with a number of nodes downstream from the connecting access node, and the connecting access node using the projected cluster size in its routing selection.

26. The method of claim 25, further comprising:
   the access node receiving the size of each of the plurality of clusters from each of the plurality of clusters, wherein each cluster comprises a gateway.

27. The method of claim 25, further comprising the access nodes receiving routing beacons from each of the clusters, the routing beacons originating at gateways of each cluster, and including information indicating the size of the corresponding cluster.

28. The method of claim 25, further comprising the access node retrieving the size of each cluster from each cluster.

29. A method of a connecting access node selecting a transmission channel, comprising:

the connecting access node evaluating transmission channels of a plurality of clusters of a wireless mesh network, wherein the connecting access node is not within the plurality of clusters;

the connecting access node selecting a transmission channel based on a combination of selection parameters, one of the parameters being the size of the clusters, wherein the size of each cluster is based on a number of access nodes within the cluster, and wherein the connecting access node estimates a projected cluster size by summing the size of each cluster with a number of nodes downstream from the connecting access node, and the connecting access node additionally uses the projected cluster size in its transmission channel selection.

30. The method of claim 29, further comprising the access node receiving a cluster size from a plurality of wireless mesh network clusters, each cluster comprising a gateway.

31. The method of claim 29, further comprising the access node retrieving the size of each cluster from each cluster.

32. The method of claim 29, further comprising the access nodes receiving routing beacons from each of the clusters, the routing beacons originating at gateways of each cluster, and including information indicating the size of the corresponding cluster.

* * * * *